United States Patent [19]

Boutni

[11] Patent Number: 4,686,256

[45] Date of Patent: Aug. 11, 1987

[54] THERMOPLASTICALLY MOLDABLE COMPOSITIONS

[75] Inventor: Omar M. Boutni, Mt. Vernon, Ind.

[73] Assignee: General Electric Company, Mt. Vernon, Ind.

[21] Appl. No.: 809,274

[22] Filed: Dec. 17, 1985

[51] Int. Cl.$^4$ .................. C08K 5/10; C08L 67/02; C08L 73/00
[52] U.S. Cl. .................. 524/318; 524/322; 524/537; 524/378; 524/385; 524/481; 524/490; 524/605
[58] Field of Search ............... 524/537, 481, 322, 318, 524/378, 385; 525/439

[56] References Cited

U.S. PATENT DOCUMENTS

| | | | |
|---|---|---|---|
| 3,164,651 | 1/1965 | Ciju | 524/385 |
| 3,516,957 | 6/1970 | Gray | 524/605 |
| 3,533,994 | 10/1970 | Stewart | 524/318 |
| 4,408,000 | 10/1983 | Lee | 524/318 |
| 4,431,767 | 2/1984 | Obora | 524/490 |
| 4,438,233 | 6/1984 | Lee | 524/318 |
| 4,438,234 | 3/1984 | Rosenquist | 524/378 |
| 4,530,953 | 7/1985 | Yoshida | 524/318 |

FOREIGN PATENT DOCUMENTS

| | | | |
|---|---|---|---|
| 2754889 | 6/1978 | Fed. Rep. of Germany | 524/537 |
| 55-84352 | 6/1980 | Japan | 524/385 |

*Primary Examiner*—C. Warren Ivy
*Attorney, Agent, or Firm*—Joseph T. Eisele; Martin B. Barancik

[57] ABSTRACT

Difficult to mold polyester resin containing compositions are made thermoplastically moldable by the addition of an aromatic polycarbonate and mold-release additives of the formula:

R-Y wherein R is selected from saturated and unsaturated hydrocarbyl having 13 to 44 carbon atoms, inclusive; and Y is selected from monovalent moieties of the formulae:

—H, —COOR′, and —O—R″ wherein R′ is selected from hydrogen and hydrocarbyl of 1 to 36 carbon atoms, inclusive; and R″ represents one of lower alkyl and lower alkenyl.

5 Claims, No Drawings

THERMOPLASTICALLY MOLDABLE COMPOSITIONS

BACKGROUND OF THE INVENTION

1. Field of the Invention

The invention relates to thermoplastically moldable polyester resin compositions.

2. Brief Description of the Prior Art

Polyester resins having properties useful for thermoplastic molding, such as injection molding, are well known. However, not all of the known polyester resins are useful for injection molding. Especially difficult to injection mold are those polyester resins which possess hot-melt adhesive properties. Other polyester resins, although not considered to be hot-melt adhesives, are difficult to injection mold because they adhere strongly to metallic surfaces when in a heat-softened condition or following cooling and re-solidification. One class of such polyester resins are those obtained by the reaction of aromatic dicarboxylic acids with cyclo-aliphatic dialkanols. An example of such polyester resins is the one described in U.S. Pat. No. 2,901,466.

It will be appreciated by those skilled in the art of injection molding that these polyesters are generally unsuited for molding in conventional injection molding apparatus. The polyester wraps itself around the screw and adheres to the metallic surfaces of the injection molding machine.

However, these polyester resins have other physical properties which may be desirable in molded articles and in articles molded from blends of resins with compatible synthetic polymeric resins which are not themselves difficult to mold by thermoplastic molding techniques.

We have found that a particular class of mold release agents, added to these polyesters blended with polycarbonates provide thermoplastic compositions which are useful to injection mold a wide variety of articles. The agents do not significantly degrade the molded resin articles, in the proportions employed.

SUMMARY OF THE INVENTION

The invention comprises a thermoplastically moldable, synthetic resin composition, which comprises;

a polyester resin prepared by condensing either the cis- or trans- isomer of 1,4-cyclohexanedimethanol with a hexacarbocyclic dicarboxylic acid;

an amount of aromatic polycarbonate sufficient to allow the polyester resin to be injection moldable; and an effective amount for mold release of a mold release additive selected from compounds of the formula:

R-Y (I)

wherein R is selected from saturated and unsaturated hydrocarbyl having 13 to 44 carbon atoms, inclusive; and Y is selected from monovalent moieties of the formulae:

wherein R' is selected from hydrogen and hydrocarbyl of 1 to 36 carbon atoms, inclusive; and R" represents one of hydrogen, lower alkyl and lower alkenyl.

The term "hydrocarbyl" as used herein means the monovalent moiety obtained upon removal of a hydrogen atom from a parent hydrocarbon other than aryl. Representative of hydrocarbyl are alkyl of 1 to 44 carbon atoms, inclusive, such as methyl, ethyl, propyl, butyl, pentyl, hexyl, heptyl, octyl, nonyl, undecyl, decyl, dodecyl, tridecyl, tetradecyl, pentadecyl, hexadecyl, heptadecyl, octadecyl, nonodecyl, eicosyl, heneicosyl, docosyl, tricosyl, tetracosyl, pentacosyl, hexacosyl, heptacosyl, octacosyl, nonoacosyl, triacontyl, hentriacontyl, dotriacontyl, tritriacontyl, pentatriacontyl, hexatriacontyl, tetratetracontyl and the isomeric forms thereof; cycloalkyl of 3 to 8 carbon atoms, inclusive, such as cyclopropyl, cyclobutyl, cyclopentyl, cyclohexyl, cycloheptyl, cyclooctyl and the like; alkenyl of 2 to 44 carbon atoms, inclusive, such as vinyl, allyl, butenyl, pentenyl, hexenyl, octenyl, nonenyl, decenyl, undececyl, dodecenyl, tridecenyl, pentadecenyl, octadecenyl, pentacosynyl, triacontenyl, tetracontenyl and isomeric forms thereof.

The terms "lower alkyl" and "lower alkenyl" are used throughout the specification and claims to mean alkyl and alkenyl as previously defined, having 1 to 4 carbon atoms, and 2 to 4 carbon atoms, respectively. The compositions of the invention are useful for injection molding of complex parts such as valves and the like. The preferred molded articles may be sterilized by radiation and are stable in clarity and at elevated temperatures.

DETAILED DESCRIPTION OF THE PREFERRED EMBODIMENTS OF THE INVENTION

Synthetic polyester resins used in the present invention are a well known class of polyester resin. Representatives of such polyester resins are those prepared by condensing either the cis- or trans- isomer (or a mixture thereof) of 1,4-cyclohexanedimethanol with a hexacarbocyclic dicarboxylic acid to produce a polyester having recurring units of the formula:

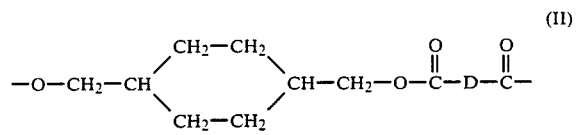

wherein the substituted cyclohexane ring is selected from the group consisting of the cis- and trans-isomers thereof and D represents an organic radical containing from 6 to 20 carbon atoms, which is the decarboxylated residue derived from a hexacarboxylic dicarboxylic acid.

Preferred polyester resins of the formula (II) given above may be derived from the reaction of either the cis- or trans- isomer (or a mixture thereof) of 1,4-cyclohexanedimethanol with a mixture of iso- and terephthalic acids. These polyesters have recurring units of the formula:

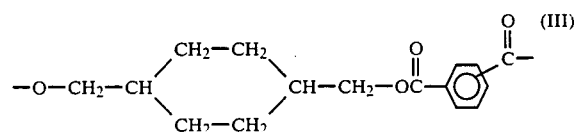

and these polyesters may be produced by well known methods in the art such as those set forth in U.S. Pat. No. 2,901,466 which is incorporated herein by reference.

Of course, it is understood that the polyester resins may also be prepared by condensing 1,4-cyclohexanedimethanol and minor amounts of other bifunctional glycols containing from 2 to 10 or more carbon atoms such as ethylene glycol, butylene glycol, and the like.

Examples of hexacarbocyclic dicarboxylic acids wherein the carboxy radicals are attached in para relationship to a hexacarbocyclic residue indicated by D in formula (II) include terephthalic acid, transhexhydroterephthalic acid, p,p'sulfonyldibenzoic acid, 4,4'-diphenic acid, 4,4'-benzophenonedicarboxylic acid, 1,2-di(p-carboxyphenyl) ethane, 1,2-di(p-carboxyphenoxy) ethane, 4,4'-dicarboxydiphenyl ether, etc. and mixtures of these. All of these acids contain at least one hexacarbocyclic nucleus. Fused rings can also be present such as in 1,4- or 1,5-naphthalenedicarboxylic acid. The hexacarbocyclic dicarboxylic acids are preferably those containing a trans-cyclohexane nucleus or an aromatic nucleus containing from one to two benzene rings of which at least one has the usual benzenoid unsaturation. Of course, either fused or attached rings can be present. All of the compounds named in this paragraph come within the scope of this preferred group. The preferred dicarboxylic acid is terephthalic acid, or mixtures of terephthalic and isophthalic acids.

The above-described polyesters generally have an intrinsic viscosity between 0.40 and 2.0 dl/g measured in a mixture of 40% tetrachloroethane/60% phenol solution or a similar solvent at 25° C. Especially preferred polyesters will have an intrinsic viscosity in the range of 0.6 to 1.2 dl/g.

A wide variety of compatible (for blending) aromatic polycarbonate resins are well known and are characterized in part by having recurring polymer units of the formula:

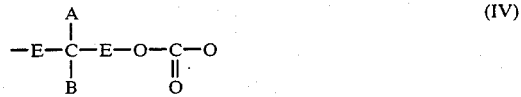 (IV)

wherein each —E— is selected from the group consisting of phenylene, halo-substituted phenylene and alkyl substituted phenylene and A and B are each selected from the group consisting of hydrogen, hydrocarbyl radicals free from aliphatic unsaturation and radicals which together with the adjoining

atom form a cycloalkane radical, the total number of carbon atoms in A and B being up to 12.

The above-described aromatic polycarbonate resins may be prepared by methods well known in the art; see for example the method described in U.S. Pat. No. 3,989,672. Thus, they may be prepared in the conventional manner by reacting a dihydric phenol with a carbonate precursor in an interfacial polymerization process. Typical of some of the dihydric phenols that may be employed are bisphenol-A, (2,2-bis(4-hydroxy-3-methylphenyl)propane, 4,4-bis(4-hydroxyphenyl)heptane, 2,2-(3,5,3', 5'-tetrachloro-4,4'-dihydroxydiphenyl)-propane, (3,3'-dichloro-4,4'-dihydroxyphenyl)methane, bis 4-hydroxy phenyl sulfone and bis 4-hydroxy phenyl sulfide. Other dihydric phenols of the bisphenol type are also available and are disclosed in U.S. Pat. Nos. 2,999,835; 3,028,365 and 3,334,154. Bisphenol-A is preferred.

It is, of course, possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in this invention. Also employed in the practice of this invention may be blends of any of the above materials to provide the aromatic carbonate polymer component.

The carbonate precursor may be either a carbonyl halide, a carbonate ester or a haloformate. The carbonyl halides which can be employed are carbonyl bromide, carbonyl chloride and mixtures thereof. Carbonyl chloride, also known as phosgene, is preferred.

Within the definition of polycarbonate also are copolyester-carbonates, that is the polymer made from a dihydric phenol, a dibasic acid and a phosgene precursor. The U.S. Pat. No. 3,169,121 discloses such copolyester-carbonates and methods of preparing them.

Also included herein are branched polymers wherein a polyfunctional aromatic compound is reacted with the dihydric phenol and carbonate precursor to provide a thermoplastic randomly branched polycarbonate polymer, wherein the recurring units of formulae (III) and (IV) above contain branching groups. The method of their preparation is described in the U.S. Patent 4,001,184, incorporated herein by reference.

Also included herein are blends of a linear polymer and a branched polymer.

Preferred polycarbonate resins employed in blends with the polyester resins previously described have an intrinsic viscosity between 0.3 and 1.0 deciliters/gram (dl/g), most preferably from 0.40 to 0.65 dl/g as measured at a temperature of 25° C. in methylene chloride or a like solvent.

The blends of polyester and polycarbonate resins are well known as are methods of their preparation; see for example the description given in U.S. Pat. No. 4,188,314. In general, the blends may be prepared under extrusion conditions (melt blending). The blends may comprise from about 10 to 95 parts by weight of the polyester resin and from 5 to 90 parts by weight of the polycarbonate resin, preferably a maximum amount of polyester is about 50 percent of the blend of polyester and polycarbonate.

The thermoplastically moldable compositions of the invention are prepared by the method of the invention, which comprises blending into the polyester resins or blends thereof with a polycarbonate resin, an effective amount for mold release of a compound of the formula (I) given above. An effective amount is generally within the range of from about 0.001 to about 0.45 weight percent of resin, preferably 0.1 to 0.3 weight percent. Greater amounts may be used, but generally are unnecessary or undesirable. Higher amounts may result in resin degradation, particularly at elevated temperatures. The mold release additives may be added to the polyester resin or blend thereof in the same manner as any conventional additive, for example, in the dry state and coextruded or in a solvent and melt extruded with the resin.

Other additives in common use in thermoplastic resins may also be added. For example with respect to blends with an aromatic polycarbonate, additives which are commonly known to stabilize the resin thermally such as a phosphite can be employed. Hydrolytic stabilizers such as epoxides may also be employed as well as agents which are flame retardants, drip inhibitors, ductility enhancers, anti-oxidants, solvent resistance enhancers, ultraviolet light stabilizers and various inert fillers.

Mold-release additive compounds of the formula (I) given above wherein Y represents hydrogen are saturated and unsaturated hydrocarbons, all of which are well known as are methods of their preparation. Representative of such hydrocarbons are tridecane, tetradecane, pentadecane, hexadecane, heptadecane, octadecane, monodecane, eicosane, henecosane, decosane, tricosane, tetracosane, pentacosane, hexacosane, heptocosane, octacosane, nonacosane, triacontane, hentriacontane, dotriacontane, tetratriacontane, pentatriacontane, hexatriacontane, pentatetracontane, cis-9-tetradecene, cis-9-hexadecene, cis-9-octadecene, cis-9-eicosene, 11-docosene, 17-hexacosene, 21-tricontene, 4-ethyl-12-12-ethyltetracontene-1, 1-tetratetracontene, and the like. Preferred hydrocarbons are alkanes of 16 to 36 carbon atoms, inclusive and monoolefin alkenes of 14 to 44 carbon atoms, inclusive.

Mold-release additive compounds of the formula (I) given above wherein Y represents a carboxyl group (—COOH) are well known also and include saturated and unsaturated fatty acids having from 14 to 45 carbon atoms, inclusive. Representative of such fatty acids are tetradecanoic, pentadecanoic, hexadecanoic, heptadecanoic, octadecanoic, nonadecanoic, eicosanoic, henecosanoic, decosanoic, tricosanoic, tetracosanoic, pentacosanoic, hexacosanoic, triacontanoic, hentriacontanoic, dotriacontanoic, tetratriacontanoic, pentatriacontanoic, hexatriacontanoic acids; cis-9-tetradecenoic, cis-9-hexadecanoic, cis-9-octadecenoic, cis-9-eicosenoic, 11-decose-noic, 17-hexacosenoic, 21-triacontenoic acids and the like.

Mold-release additives of the formula (I) given above, wherein Y is a moiety of formula —COOR' and wherein R' is hydrocarbyl of 1 to 36 carbon atoms, inclusive, include esters which may be prepared by the esterification of a fatty acid within the scope of the formula (I) as described above, with preferably an alcohol of the formula:

R-OH     (V)

wherein R is as defined above, limited to a carbon content of from 1 to 36 carbon atoms, inclusive. Alcohols of the formula (V) given above are well known and are represented, for example, by methanol, ethanol, propanol, butanol, pentanol, hexanol, heptanol, octanol, nonanol, decanol, undecanol, dodecanol, tridecanol, tetradecanol, pentadecanol, hexadecanol, heptadecanol, octadecanol, nonadecanol, eicosanol, triaconanol and the like. The esterification may be carried out by known and conventional methods; see for example the methods of Walden, Ber. 36,781 (1903) or Smith, J. Chem. Soc., 802 (1931).

Representative of fatty acid esters advantageously employed as mold release agents in the method of the invention are methyl tetradecanate, methyl docosanate, stearyl docosanate, butyl pentacosanate and the like.

Compounds of the formula (I) given above wherein Y represents the moiety of formula —O—R" as defined above are alcohols mixed or symmetrical ethers of the saturated and unsaturated alkanes and alkenes described above. They may be prepared by dehydration of the appropriate monoalcohols; see for example the method of Vogel, J. Chem. Soc., 616 (1948) and Norris et al., J. Am. Chem. Soc., 54, 2088 (1932). Representative of ether mold release additives within the scope of the formula (I) given above are methyl tetradecanyl ether, propyl docosanyl ether, butyl pentacosanyl ether and the like. The vinyl ethers may be prepared by the methods of Wantanabe et al., J. Am. Chem. Soc., 79, 2828 (1957) or Burgstahler et al., J. Am. Chem. Soc., 83, 198 (1961). Representative of vinyl ethers are tetradecyl vinyl ether, n-hexadecyl vinyl ether, n-eicosyl vinyl ether, 2,4-di-n-propyleicosyl vinyl ether and the like.

The following examples describe the manner and process of making and using the invention and set forth the best mode contemplated by the inventor of carrying out the invention but are not to be construed as limiting the invention. All proportions of the mold releasing additives are in weight percent (parts by weight) of the base thermoplastic resin.

The mold-release pressures obtained with the various mold-release additives were obtained on an injection molding machine with a 118 cc shot capacity. The mold is a 7.62 cm × 7.62 cm box with a 3.8 cm wall height. It has ejector pins at four corners with two of the pins being attached to strain gauge transducers for measuring the part ejection pressure. The mold is designed with very little draft so that the part would tend to stick to the core unless mold-release is used. The pressures reported are an average of a number of mold ejections. The number of ejections averaged is also reported.

The yellowing Index (YI), where reported, was determined by the method of ASTM-D-1925-70.

EXAMPLES 1–6

A resin blend of 50 parts of poly(1,4-cyclohexane-dimethanol-terephthalate-co-isophthalate) made from the reaction of terephthalic acid and isophthalic acid with the glycol, 1,4-cyclohexanedimethanol [Kodar ® A-150, Eastman Kodak Co.]and 50 parts of a polycarbonate resin made from the reaction of bisphenol-A and phosgene (LEXAN ® 105, General Electric Co.) stabilized with 0.1 parts of an aqueous solution of phosphorous acid (70%) is provided. The polycarbonate resin is the product of reaction of bisphenol-A and phosgene and has an inherent viscosity of from 0.40 to 0.65 dl/g measured at 25° C. in methylene chloride.

The resin mixture (100 parts) is separately dry formulated with a variety of mold-release agents, blended and melt extruded from a conventional extruder into the box mold described above. After cooling to a demolding temperature, the molding is ejected. The agent and the proportion added (PBW) together with the averaged observed ejector pin pressures are set forth in the following Table, with the number of readings of pin pressure averaged, the yellowing index (YI) observed, the light transmittance of the molded product and the percent of haze observed for the molded product where such data was available.

EXAMPLE 7

The procedure of Examples 1-6, supra., is repeated except that no additive is added to the resin blend. The molding results are set forth in the Table, below is a control.

EXAMPLE 8

The procedure of Examples 1-6, supra., is repeated except that in place of the resin blend as used therein, 100 parts of the Kodar A-150 polyester alone are used. The resin cannot be molded.

TABLE

| EXAMPLE | ADDITIVE | PBW | EJECTOR PIN PRESSURE (Kg/cm$^2$) | NO. READINGS | YI | TRANSMITTANCE (%) | HAZE (%) |
|---|---|---|---|---|---|---|---|
| 1 | DOCOSANOIC ACID | 0.06 | 436.5 | (11) | 2.5 | 89.8 | 0.6 |
| 2 | DOCOSANOIC ACID | 0.2 | 220.4 | (10) | 2.3 | 89.5 | 0.5 |
| 3 | DOCOSANOIC ACID | 0.3 | 220.5 | (12) | 2.6 | 89.8 | 0.7 |
| 4 | OCTADECANOIC ACID | 0.1 | 361.0 | (10) | 2.4 | 89.8 | 0.6 |
| 5 | METHYL DOCOSANATE | 0.3 | 252.5 | (25) | 2.7 | 89.1 | 1.4 |
| 6 | STEARYL DOCOSANATE | 0.3 | 244.8 | (11) | 2.5 | 89.3 | 0.8 |
| 7(Control) | NONE | 0 | Parts broke - could not be ejected | | | | |

What is claimed:

1. A thermoplastically injection moldable, synthetic resin composition, which comprises;
    a polyester resin which is the condensation product of a diol selected from the group consisting of the cis- and the trans-isomer of 1,4-cyclohexanedimethanol with a hexacarbocyclic dicarboxylic acid selected from the group consisting of isophthalic acid, terephthalic acid, and mixtures thereof;
    sufficient quantity of aromatic polycarbonate resin to allow said polyester resin to be injection moldable; and
    an effective amount for mold-release of a mold-release additive selected from compounds of the formula:

R-Y wherein R is selected from alkyl having 17 to 40 carbon atoms, inclusive; and Y is selected from monovalent moieties of the formula: —COOR' wherein R' is selected from hydrogen and alkyl of 1 to 18 carbon atoms, inclusive.

2. The composition of claim 1 wherein the effective amount of mold release additive is within the range of from about 0.001 to 0.45 weight percent of the resin.

3. The composition of claim 2 wherein the quantity of aromatic polycarbonate used to permit injection molding is from 5 to 85 weight percent of the composition.

4. The composition of claim 3 wherein the polycarbonate comprises about 50 weight percent of the composition.

5. The composition of claim 3 wherein the additive is the ester of a fatty acid and an alcohol of the formula

R-OH wherein R is as defined in claim 1.

* * * * *